Jnventor:
Hans-Dieter Schneider
by MICHAEL S. STRIKER
attorney

Inventor:
Hans-Dieter Schneider
by MICHAEL S. STRIKER
attorney 3,273,007
Patented Sept. 13, 1966

3,273,007

CIRCUIT ARRANGEMENT FOR PRODUCING A SAWTOOTH WAVEFORM OF HIGH LINEARITY

Hans-Dieter Schneider, Gross-Gerau, Germany, assignor to Fernseh G.m.b.H., Darmstadt, Germany Filed Apr. 10, 1963, Ser. No. 271,978
Claims priority, application Germany, Apr. 11, 1962, F 36,527; Sept. 20, 1962, F 37,844
15 Claims. (Cl. 315—27)

Figure 1:
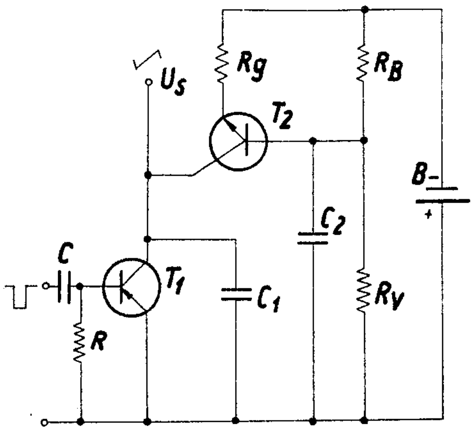

A sawtooth deflection field of high linearity is necessary for deflecting the electron beam of a cathode ray tube linearly with time. For the magnetically deflected picture tubes of television apparatus a linear sawtooth current is necessary for the line reflection and a deflection voltage of sawtooth form for the vertical deflection. Many methods are known in which a control voltage of linear sawtooth form is produced and is applied to the picture tube through the intermediary of a suitable amplifier. It is often necessary that the sawtooth voltage rise strictly linearly with time in order to avoid distortion of the picture symmetry. In other cases the sawtooth voltage must be distorted in a definite manner in order to equalize reactive components present in the deflection circuit. Circuit arrangements for producing an exactly linear sawtooth voltage hitherto proposed have either been very complex or, if simply constructed, have been more or less strongly inclined to departure from linearity.

The present invention seeks to solve the problem of providing a circuit arrangement in which with relatively simple means there may be produced a sawtooth voltage which is almost exactly linear or is distorted in a desired manner. A further object of the invention is to provide a circuit arrangement for a sawtooth voltage generator in which by the introduction of a stabilizing circuit a high degree of stability of the output amplitude is assured despite fluctuations of temperature and variations from the nominal values of the circuit components.

In a known basic circuit arrangement a transistor is employed as a switch, which during the flyback intervals is closed by a negative-going impulse and thus discharges a capacitor. The capacitor then charges by way of a resistor so that the waveform of the voltage generated follows an exponential law, which in its initial portions possesses a relatively linear region. The smaller the ratio of the signal voltage produced across the capacitor to the supply voltage, the greater the linearity of the voltage rise. The supply voltage must therefore be made as high as possible.

It is possible to avoid the expense of a high supply voltage and to reduce errors in linearity if the resistor through which the capacitor is charged is replaced by a constant-current charging path, for example a pentode tube, the anode of which is connected to the capacitor. It is true that owing to the finite slope of the tube the rise in voltage across the capacitor cannot be made exactly linear, but the degree of linearity is sufficient in many cases, e.g., for electrostatically deflected cathode ray tubes.

For magnetic deflection, however, a nonlinearity in the rise of current is produced owing to the presence of time-constants in the deflection circuit, since the load impedance which is formed by the deflection coils and the coupling elements cannot be made completely real. The rise of current thus obeys the equation:

$$i=I_0\cdot(1-e^{-t/T})$$

where $I_0$ is the current at the begin of the rise, and T is the time-constant of the deflection coils. If the rise of current is relatively slow, so that the inductance may be neglected, and the coils are connected to the generator by way of a coupling capacitor, then $$T=R_{\text{coils}}\cdot C_{\text{coupling}}$$

The departure from linearity in the rise of current then gives rise to an error similar to that occurring in the circuit arrangement initially described. It is possible to obtain an appropriate voltage in which this additional error has been taken into account by distorting the voltage generated, in a subsequently connected four-pole, for example, so that an approximately linear rise of current is produced in the deflection coils. It is a disadvantage of this method, however, that a substantial attenuation of the already small sawtooth voltage traversing the four-pole is produced. This loss in amplitude must be compensated by subsequent amplification before the sawtooth voltage passes to the final amplifier. In addition, the capacitors employed in the RC circuit are often electrolytic capacitors, especially when a relatively slow deflection process is concerned, for which high capacitances are necessary in the corrector circuit. Such electrolytic capacitors possess high temperature coefficients and are liable to change in capacitance with age, which may introduce further sources of distortion.

Another possibility for the compensation of these errors is to cause the charging current to have a waveform in which the departure from linearity is opposed to the nonlinearity referred to above.

According to the present invention there is provided a sawtooth voltage generator circuit arrangement comprising a capacitor shunted by the emitter-collector path of a first transistor, to the base of which are applied voltage pulses such as to make said transistor conductive during the flyback intervals of said sawtooth voltage, together with a second transistor of the conductivity type complementary to that of said first transistor, through the emitter-collector path of which said capacitor is arranged to be continuously charged, the base potential of said second transistor being arranged to be controlled by the potential appearing across a time-constant circuit which is discharged simultaneously with the charging of said capacitor and is charged simultaneously with the discharge of said capacitor, in such a manner that at the commencement of the working stroke said second transistor is caused to possess a high resistance.

In addition, the amplitude of the sawtooth voltage produced may be influenced by a control voltage applied to the second transistor, either for the remote control of the amplitude of the generated sawtooth voltage or for the stabilization of this amplitude against fluctuations of the operating parameters. It is possible to carry out the required control by applying the control voltage to vary the potential at the base of the second transistor. This arrangement, however, is found to introduce certain disadvantages, since with such a connection of the circuit producing the control voltage it is not possible to avoid some effect upon the linearizing time-constant and a consequent deviation from the desired voltage waveform. Such an arrangement possesses particular disadvantages in cases where it is desired to apply either an alternating voltage alone or an alternating voltage superimposed upon a direct voltage to modulate the sawtooth amplitude.

According to one embodiment of the invention, therefore, a control voltage is applied to the second transistor by producing an additional voltage drop across a resistor in its emitter circuit. Preferably the additional voltage drop in this emitter resisor is produced by using an additional transistor of the same conductivity type as said second transistor, which has its emitter connected to that of the second transistor, while the collector of this additional transistor is connected to a point of fixed potential and a controlling direct potential is applied to its base. In simple cases, in which a less-constant output amplitude is adequate, a negative feedback voltage may be applied to this circuit either alone or together with a controlling direct potential.

A particular advantage of this embodiment of the invention consists in the fact that by feeding in the controlling potential at this point any undesired effect upon the time-constant circuit employed for linearization is avoided. In addition to this, the gain in the control circuit may be made greater than unity without it being necessary to connect in the control circuit an active four-pole which may have a disadvantageous effect upon the control characteristic. A gain greater than 1 is obtained because the full slope of the second transistor, operating as a charging impedance, is effective in the control circuit. The double function of this second transistor also produces compensation both for the variations of gain with temperature in the sawtooth generator and in the control circuit.

A stabilized sawtooth generator of this kind may find application especially where a particularly linear and also stable sawtooth voltage is required. In the practical application of such a circuit arangement for the vertical scan generator associated with a cathode ray tube used in television apparatus it has been found that the circuit arrangement is extraordinarily insensitive to alterations of temperature and to spread in the amplification factor of the transistors employed, so that equalization of gain and of the zero point become superfluous. Similarly, replacement of a transistor has almost no influence upon the amplitude and linearity.

Figures 2, 4, 5:
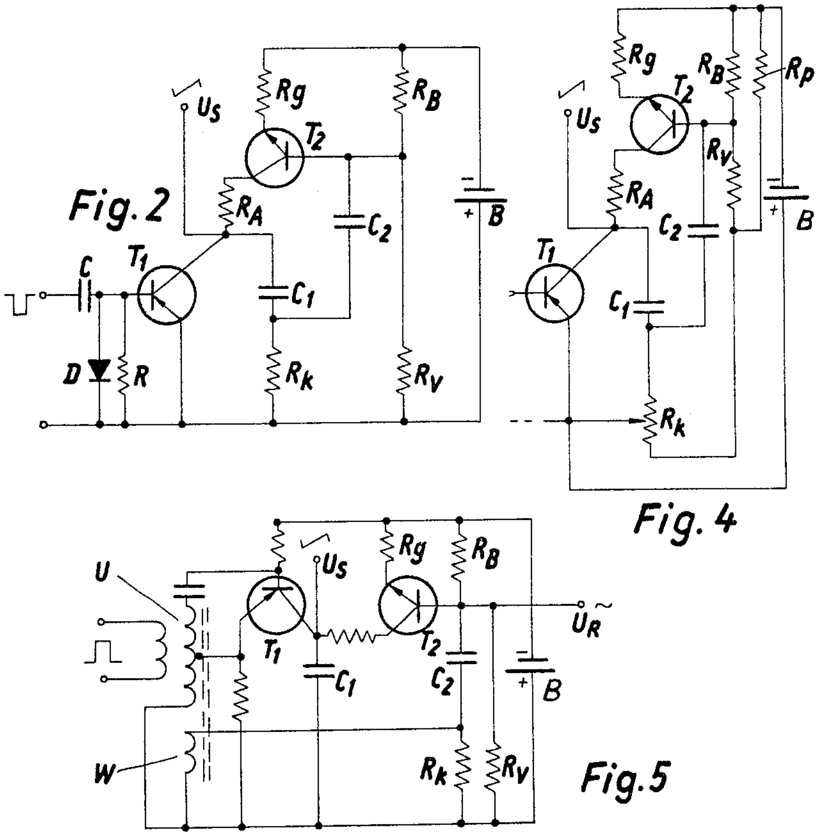
Figure 3:
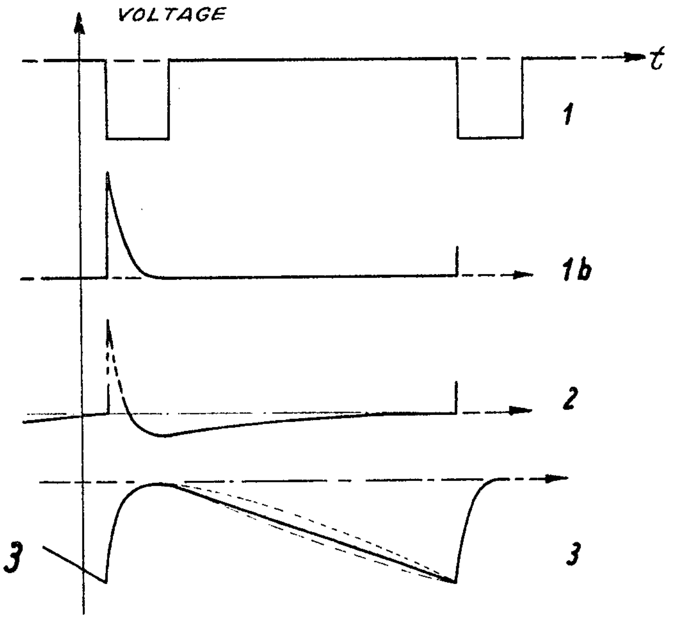
Figure 6:
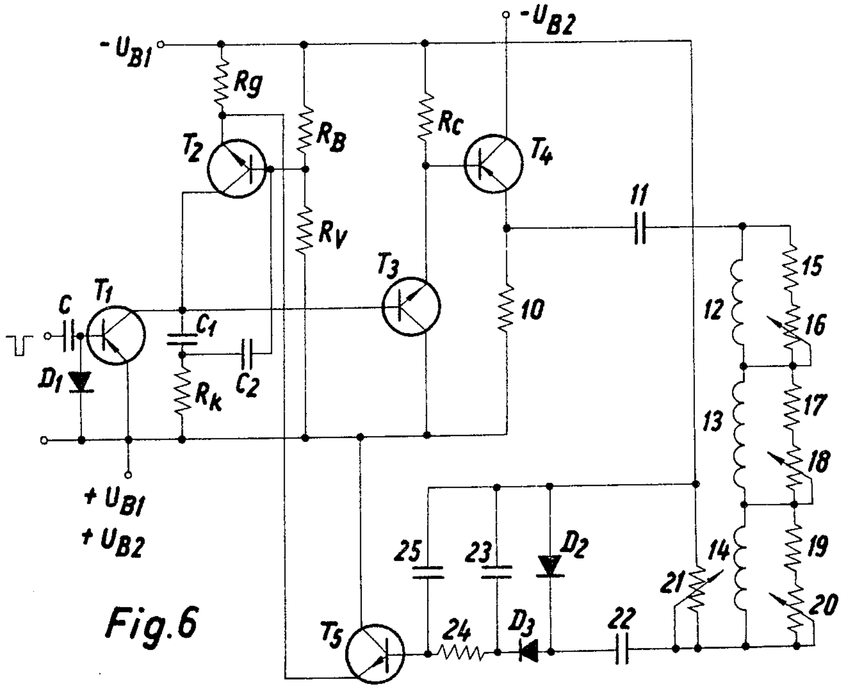

The invention will now be further described with reference to the accompanying drawings, in the several figures of which like reference characters are used to denote like elements and which comprise FIGURES 1 to 6, of which:

FIGURE 1 shows a circuit arrangement according to the present invention for generating a sawtooth voltage with a substantially linear working stroke, FIGURE 2 shows another form of circuit arrangement according to the invention for producing a sawtooth voltage which may vary with time either linearly or so as to provide predistortion such as to compensate for reactive components of the load, FIGURE 3 is a series of voltage diagrams illustrating the production of the control voltage for the auxiliary transistor employed in circuit arrangements according to the invention, FIGURE 4 shows a modified circuit arrangement providing adjustable linearity and including a device for maintaining constant the amplitude of the sawtooth voltage generated, FIGURE 5 shows a similar arrangement using a blocking oscillator as an impulse generator, and FIGURE 6 shows the circuit arrangement of a sawtooth generator including a special control arrangement.

In the circuit illustrated in FIGURE 1, $T^1$ is a first p-n-p switching transistor, to the base of which negative-going impulses are applied by way of a capacitor C. $U_s$ in FIGURES 1, 2, 4 and 5 designates the sawtooth voltage at the point at which the signal voltage is taken from the circuit. The emitter-collector path of transistor $T_1$ is connected in shunt with a capacitor $C_1$, which is charged from a battery B by way of an impedance consisting of the internal resistance of a second transistor $T_2$ of the complementary conductivity type, in this case an n-p-n transistor, and a resistor $R_g$ in its emitter lead. The effective value $R_L$ of this transistor charging resistance is equal to the output resistance $R_o$ of the transistor, so that:

$$R_L = R_O = \frac{1}{h_{22}\cdot\left[1 - \frac{h_{21}\cdot h_{12}}{h_{22}\cdot(h_{11}-r)_g}\right]}$$

In this expression the well-known four-pole characteristics of the transistor are employed, as set out in the following definitions:

$h_{11}=(v_1/i_1)_{v_2}=0$ input resistance with output short-circuited $h_{12}=(v_1/v_2)_{i_1}=0$ reverse voltage transfer with input open-circuit $h_{21}=(i_2/i_1)_{v_2}=0$ forward current transfer with output short-circuited $h_{22}=(i_2/v_2)_{i_1}=0$ output conductance with input open-circuit $\frac{1}{r_g}=\frac{1}{R_B}+\frac{1}{R_V}+\frac{1}{R_g}$ resistance of the control voltage source The charging current flowing into capacitor $C_1$ thus becomes $$I_L \approx \frac{V_B - V_{C_1}}{R_L}$$

The variation of the charging current, and thus the residual nonlinearity of the voltage rise on $C_1$, which represents the generator of the voltage across $T_2$, is still, however, dependent upon the reactive effect of the output electrode on the input electrode of $T_2$.

The current in a transistor is in general distributed as shown below:

$$I_e = I_c + I_b$$

where $I_e$ is the emitter current, $I_b$ the base current and $I_c$ the collector current. Since in addition $I_c > I_b$ and, for the charging transistor $T_2$, $I_c = I_L$, the charging current of the capacitor $C_1$, $T_2$ is controlled by the remaining alterations of charging current at the emitter, that is, $T_2$ operates in the common-base configuration. It is here assumed that the current gain $\alpha$ is less than unity; values of 0.99 may however be obtained and in fact $\alpha$ becomes greater when the value of the emitter resistor $R_g$ of transistor $T_2$ is increased, since:

$$\alpha \approx \frac{Rg}{\frac{1}{\frac{h_{21}-h_{12}}{h_{11}}} + R_g}$$

Thus when $\alpha$ is equal to 1 the variation of charging current, $I_L$, because zero and $I_L$ therefore becomes constant. Since this ideal case cannot be realized in practice, for this required $R_g$ to be of infinite value, a residual error remains and the charging current $$i = C_1.dv/dt$$

becomes only approximately constant.

The ideal case also implies that the amplitude of the sawtooth voltage becomes smaller when the emitter resistance is increased. The invention is particularly concerned with the problem of improving this circuit in such a manner that, despite the use of an emitter resistance of relatively low value, a high linearity may be obtained together with a large amplitude of sawtooth. Moreover, in the case where time-constant elements are present in the deflection coil circuit, even an exactly linear sawtooth voltage is not sufficient, since at the beginning of the working stroke a curvature opposed to the normal distortion of the exponential function is necessary. A circuit arrangement which fulfills these conditions is shown in FIGURE 2. In this circuit $T_1$ and $T_2$ are transistors corresponding to those of FIGURE 1, while $C_1$ is again the capacitor across which the sawtooth voltage is generated. The capacitor $C_2$, though similarly connected, has a function differing from that of $C_2$ in FIGURE 1. The circuit arrangement shown in FIGURE 2 also differs from that of FIGURE 1 in that the capacitor $C_1$ is connected by way of a resistor $R_k$ with the positive pole of the battery B, instead of directly as in FIGURE 1. Resistors $R_B$, $R_V$ and $R_g$ are provided as before for adjusting the bias voltage applied between base and emitter of transistor $T_2$. Capacitors $C_1$ and $C_2$ are thus no longer connected to the positive terminal of battery B directly, but instead are connected to that terminal by way of a series resistor $R_k$.

The introduction of this series resistor produces the result that when transistor $T_1$ is made conductive, capacitor $C_1$ is no longer immediately and completely discharged, so that a positive-going impulse appears across resistor $R_k$ at the instant at which $T_1$ is made conductive. This resistor $R_k$, which supplies the charging voltage for $C_2$, may be given a very low value, for example 50Ω. This impulse charges the capacitor $C_2$ in accordance with a time-constant which is formed by the capacitance of the capacitor and the total circuit resistance formed by the parallel combination of $R_B$, $R_V$ and the internal resistance of transistor $T_2$ in series with resistor $R_k$. The internal resistance of transistor $T_2$ is transiently very small, since the positive-going impulse applied to its base turns it full on, while at the same time its collector is connected to the full positive potential of the battery by the opening of transistor $T_1$. The charging time-constant of this circuit is therefore very small. At the end of the process of discharging $C_1$ the positive voltage impulse on $R_k$ dies away and the alteration of charge on $C_2$ takes effect as a shift of the base potential of $T_2$ to a more negative value, provided that the resistance of resistor $R_k$ is less than the value of resistors $R_B$, $R_V$ and $R_g$ in parallel with the input resistance of transistor $T_2$. The input resistance $h_{11}$ of transistor $T_2$ is now relatively large, since $T_1$ is again cut off and $C_1$ is commencing to charge. This means that the output resistance of transistor $T_2$, which forms the charging resistance for capacitor $C_1$, has been increased. Since at the commencement of the process of charging $C_1$ the capacitor $C_2$ is discharging in accordance with an exponential function, the time-constant of which is determined by the resistances associated with $C_2$, this alteration of voltage at the control electrode of $T_2$ effects an alteration of the charging resistance of $C_1$ in accordance with the equation:

$$R_L=r_O=R_O\cdot h_{21}\cdot e^{-(t/(R_X\cdot C_2))}$$

where $R_L$ is the instantaneous value of the charging resistance, $r_O$ is the instantaneous value of the internal resistance of the transistor and $R_X$ is the effective value of the combination of resistors associated with $C_2$.

If, for the sake of simplicity, it is assumed that without the additional control of $T_2$ the charging of $C_1$ is effected linearly, so that the voltage V across this capacitor follows the law $V=t/(R_L\cdot C_1)$, then by substituting for $R_L$ there resultts:

$$V_{L1}=(t/C_1)\cdot e^{+(t/(R_X\cdot C_2))}\text{ const.}$$

that is, upon the linear sawtooth there is superimposed an exponential function of positive curvature. It thus becomes possible wholly or in part to equalize or overcompensate any negative curvature.

The influence of the resistance $R_g$ is negligible compared with that of the internal resistance of the transistor $T_2$. The variation with time of the resistance of transistor $T_2$ may be influenced by appropriate choice of the values of resistors $R_k$, $R_B$ and $R_V$. It is thus possible effectively to compensate any distortion resulting from the presence of reactive components in the deflection circuit of a vertical scan generator and thus to avoid any diminution in the amplitude of the control voltage. Furthermore, subsequent amplification often becomes unnecessary, since the linearizing circuits in the sawtooth generator are not energy-consuming.

The control voltage at the input of transistor $T_2$ effects an alteration of the internal resistance $R_O$ of this transistor, and thus produces an alteration in the charging current of capacitor $C_1$. If the resistance $R_A$ is now connected in the collector lead of transistor $T_2$, then the alteration of the charging current in $T_2$ resulting from the control voltage developed in the auxiliary discharge circuit produces an additional alteration of voltage across resistor $R_A$, proportional to this current, which results in an increased alteration of the charging current.

The variation of the voltage at the base of transistor $T_2$ is further explained with reference to FIGURE 3. In this figure curve 1 represents the waveform of the control impulse applied to the base of transistor $T_1$ and the curve 1*b* shows the voltage transient which results from the voltage drop across resistor $R_k$ as transistor $T_1$ is turned on. This rapidly decaying voltage at the base of transistor $T_2$ gives rise to a discharge of the capacitor $C_2$ which has the slow recovery shown in curve 2 of FIGURE 3. Curve 3 of FIGURE 3 representing the variation of voltage on capacitor $C_1$ exhibits a somewhat exponential waveform shown in broken line. By amplification of waveform 2 in transistor $T_2$ the variation of the voltage on the capacitor is curved in the opposite sense, since at the commencement of the working stroke when the voltage 2 is greater, the charging resistance provided by transistor $T_2$ is greater than at the end of the stroke, resulting in the appearance of the voltage illustrated by the dotted line. It is thus seen that by appropriate choice of $R_A$ and/or $R_k$ practically any desired exponent may be produced. If it is necessary, an S-shaped curvature of the voltage variation may also be produced.

An extension of the circuit arrangement described in relation to FIGURE 2 is obtained by making $R_A$, or preferably $R_k$, adjustable with the aid of a potentiometer, so that provision is made for regulating the linearity of the waveform generated. Since an increase of $R_k$ gives rise to a diminution in the amplitude of the discharge in $C_1$, this manifests itself in a reduction of the sawtooth amplitude, as well as in an alteration of linearity. In order to make the output amplitude constant over the range of control of $R_k$ and independent of the control of linearity, the base bias voltage applied to transistor $T_2$ may be simultaneously readjusted as shown in the modified circuit of FIGURE 4. In this circuit, when the linearity of the output voltage is altered by shifting the slider on the potentiometer $R_k$, the bias applied to transistor $T_2$ is also altered so that the amplitude remains constant. This may be ensured by appropriate choice of the value of resistor $R_p$ shunting the voltage divider $R_B$, $R_V$ from which the base potential of $T_2$ is taken.

The circuit may also be modified to include a free-running or synchronized blocking oscillator, the switching transistor $T_1$ being connected to a feedback transformer. FIGURE 5 shows such a circuit arrangement, in which the transformer U is the blocking-oscillator transformer. This circuit possesses the peculiarity that the auxiliary capacitor $C_2$ does not receive its charge from the discharge circuit of the capacitor $C_1$, so that a tap on the resistor $R_k$ in series with the capacitor $C_1$ is not necessary. The charging voltage for the capacitor $C_2$ is taken directly from the transformer U by an auxiliary winding W and is applied to a resistance $R_k$ through which the capacitor $C_2$ is charged to the desired potential. Regulation of the time-constant can be effected by choice of the ratio of the values of resistors $R_B$ and $R_V$. $U_R$ in FIGURE 5 is a control voltage supplied to the transistor $T_2$ by means of which the amplitude of the produced sawtooth voltage may be influenced.

In a practical embodiment of a circuit arrangement according to FIGURE 2 or FIGURE 4, capable of producing a sawtooth voltage with a repetition rate of 50 c./s. and therefore suitable for the field scan generator of a television equipment, the following component values may be employed:

Resistors:
- R—1.5 KΩ
- $R_g$—680Ω
- $R_B$—1.8 KΩ
- $R_V$—39Ω

Capacitors:
- C—0.05 μf.
- $C_1$—1 μf.
- $C_2$—2 μf.

Voltages:
- Supply $U_B$—12 volts
- Output $U_s$—7 volts peak-to-peak

Resistors:
- $R_p$—680 KΩ
- $R_A$—4.7 KΩ
- $R_K$—50Ω

Transistors:
- $T_1$—Mullard OC44
- $T_2$—Mullary OC141

Diode:
- D—Mullard OA5

FIGURE 6 shows an embodiment of a stabilized scan generator according to the invention. In FIGURE 6, the circuit elements corresponding to those of FIGURE 2 are designated by the same reference characters. The sawtooth voltage arising across capacitor $C_1$ is applied to the base of a transistor $T_3$, which is of the conductivity type complementary to that of transistor $T_1$ and which has a resistor $R_c$ in its emitter lead. From this resistor is taken the drive voltage for an output stage consisting of a transistor $T_4$ with an emitter load resistor 10. Transistor $T_4$ is best fed from an individual direct current source $U_{B_2}$ with a higher potential than that of the source $U_{B_1}$ from which the remaining transistors take their operating currents. The signal voltage appearing across resistor 10 is fed through a coupling capacitor 11 to the load, which is here represented as three deflection coils 12, 13, 14 connected in series. These deflection coils may be the field deflection coils of three cathode ray tubes used for pickup or for reproduction of the three colour components of a colour television picture. The connection of the deflection coils in series is particularly advantageous, since possible variations of the deflection current then affect all the deflection fields equally, thus largely avoiding registration errors from this cause.

To stabilize the deflection currents flowing in this circuit arrangement there is now connected in series with the deflection coils an adjustable resistor 21, which is returned to the negative terminal of the source $U_{B_1}$, which is at the same signal potential as the negative terminal of the source $U_{B_2}$. The alternating voltage appearing across this resistor 21 is applied by way of a capacitor 22 to a pair of diodes $D_2$, $D_3$, arranged to develop across a capacitor 23 a potential equal to the peak value of the alternating voltage applied to their junction. The potential appearing across capacitor 23 is applied by way of a filter circuit consisting of a transistor $T_5$, the emitter-collector path of which is connected between the common positive terminal of sources $U_{B_1}$ and $U_{B_2}$ and the emitter of transistor $T_2$. The gain of transistor $T_2$ is thus controlled in such a manner that the amplitude of the sawtooth current passing through the deflection coils is maintained substantially constant.

Since the total deflection current is so stabilized, it becomes possible to effect independent adjustment of the currents flowing in each of the deflection coils 12, 13, 14 by connecting in shunt with each the series combination of a fixed and an adjustable resistor 15, 16, 17, 18 and 19, 20 respectively. Since the stabilization of the total current keeps the load constant, adjustment of the amplitudes of the individual deflection fields by varying the values of resistors 16, 18 or 10 does not produce any mutual interaction.

The total current in the load may be adjusted by altering the value of resistor 21. Naturally the sawtooth voltage applied to the load impedance may be kept constant, if required, by appropriately deriving the control voltage from the output amplitude.

Appropriate component values for the circuit arrangement shown in FIGURE 6 are as follows:

Resistors:
- $R_g$—360Ω
- $R_V$—39 KΩ
- $R_B$—1.8 KΩ
- $R_k$—50Ω
- $R_c$—3.9 KΩ
- 10—100Ω
- 15, 17, 19—2.2 KΩ
- 16, 18, 20—10 KΩ
- 24—12 KΩ
- 21—15 KΩ

Capacitors:
- $C_1$—0.5 μf.
- 22—10 μf.
- 23—50 μf.
- 11—500 μf.
- 25—50 μf.
- C—0.5 μf.
- $C_2$—1.5 μf.

Transistors:
- $T_1$—Mullard 2SA17
- $T_2$, $T_3$, $T_5$—Mullard OC141
- $T_4$—Mullard AC124

Diodes:
- $D_1$, $D_2$, $D_3$—Mullard OA5

Sources:
- $U_{B_1}$—15 v. $U_{B_2}$—33 v.

What is claimed as new and is desired to be secured by Letters Patent is:

1. A sawtooth voltage generator circuit arrangement for providing a determined type of sawtooth voltage, comprising a capacitor for producing a sawtooth voltage; and a time constant circuit directly connected in series with said capacitor for controlling the charging and discharging of said capacitor by a time constant which provides an exponential function having a curvature opposed to the curvature of the charging voltage of said capacitor.

2. A sawtooth voltage generator circuit arrangement for providing a determined type of sawtooth voltage, comprising a capacitor for producing a sawtooth voltage; and a time constant circuit directly connected in series with said capacitor for controlling the charging and discharging of said capacitor by a time constant which provides an exponential function having a curvature opposed to the curvature of the charging voltage of said capacitor, said time constant circuit comprising a resistor connected to said capacitor; and means for applying a D.C. potential to said resistor.

3. A sawtooth voltage generator circuit arrangement for providing a determined type of sawtooth voltage, comprising a capacitor for producing a sawtooth voltage; and a time constant circuit connected to said capacitor for controlling the charging and discharging of said capacitor by a time constant which provides an exponential function having a curvature opposed to the curvature of the charging voltage of said capacitor, said time constant circuit comprising a resistor connected to said capacitor, a transistor, and a second capacitor connected between said transistor and a point common to said capacitor and said resistor; and means for applying a D.C. potential across the combination of said resistor, second capacitor and transistor.

4. A sawtooth voltage generator circuit arrangement for providing a determined type of sawtooth voltage, comprising a first capacitor for producing a sawtooth voltage; first and second transistors each having emitter, collector and base electrodes and each having an emitter-collector path, each of said first and second transistors being switchable to one of a conductive and a non-conductive condition, said first and second transistors being of complementary conductivity types; a first resistor connected in series between the emitter-collector paths of said first and second transistors; a second resistor connected in series with said first capacitor, the series connection of said second resistor and said first capacitor being connected in parallel with the emitter-collector path of said first transistor; biasing voltage means for continuously charging said first capacitor through said second resistor; input means for supplying voltage pulses to the base electrode of said first transistor for switching said first transistor to its conductive condition during the flyback intervals of the sawtooth voltage; and a time constant circuit connected to the base electrode of said second transistor, said time constant circuit including said second resistor and said second transistor and discharging simultaneously with the charging of said first capacitor and charging simultaneously with the discharging of said first capacitor.

5. A sawtooth voltage generator circuit arrangement as claimed in claim 4, wherein said time constant circuit further includes a second capacitor connected to the base electrode of said second transistor, said second capacitor discharging simultaneously with the charging of said first capacitor and charging simultaneously with the discharging of said first capacitor.

6. A sawtooth voltage generator circuit arrangement as claimed in claim 4, wherein said time constant circuit further includes a second capacitor connected to the base electrode of said second transistor, said first capacitor is connected between the collector electrode of said first transistor and said second resistor, said second resistor is connected between said first capacitor and the emitter electrode of said first transistor, and said second capacitor is connected between a point common to said first capacitor and said second resistor and the base electrode of said second transistor.

7. A sawtooth voltage generator circuit arrangement as claimed in claim 4, further comprising an emitter resistor, and wherein said biasing voltage means comprises a source of D.C. potential having a positive terminal connected to said second resistor and a negative terminal connected to the emitter electrode of said second transistor through said emitter resistor.

8. A sawtooth voltage generator circuit arrangement as claimed in claim 4, wherein said second resistor is variable.

9. A sawtooth voltage generator circuit arrangement as claimed in claim 4, further comprising a load circuit coupled to said first capacitor, and means for controlling the emitter potential of said second transistor in proportion to the peak amplitude produced by the sawtooth voltage in said load circuit so that adjustment of the time constant of said time constant circuit enables adjustment of the shape of the sawtooth voltage without alteration of the amplitude of said sawtooth voltage.

10. A sawtooth voltage generator circuit arrangement as claimed in claim 9, wherein said load circuit comprises a plurality of deflector coils of independent cathode ray tubes connected in series with each other.

11. A sawtooth voltage generator circuit arrangement as claimed in claim 4, further comprising a blocking oscillator circuit including said first transistor.

12. A sawtooth voltage generator circuit arrangement as claimed in claim 11, wherein said blocking oscillator circuit includes a feedback transformer having a feedback winding connected to said time constant circuit.

13. A sawtooth voltage generator circuit arrangement as claimed in claim 4, further comprising an emitter resistor and a pair of potentiometer resistors, and wherein said biasing voltage means comprises a source of D.C. potential having a positive terminal connected to said second resistor and a negative terminal connected to the emitter electrode of said second transistor through said emitter resistor, and said pair of potentiometer resistors are connected in series with each other between the positive and negative terminals of said source of D.C. potential.

14. A sawtooth voltage generator circuit arrangement as claimed in claim 13, wherein the resistance of said second resistor is low compared with the resistances of said potentiometer resistors and said emitter resistor.

15. A sawtooth voltage generator circuit arrangement as claimed in claim 13, wherein said second resistor is variable and variation of said second resistor simultaneously varies the bias potential applied to the base electrode of said second transistor so that the shape of the sawtooth voltage is altered while the amplitude of said sawtooth voltage remains substantially constant.

References Cited by the Examiner

UNITED STATES PATENTS

| | | | |
|---|---|---|---|
| 2,824,230 | 2/1958 | Fathauer | 328—184 X |
| 2,891,173 | 6/1959 | Helbig | 307—88.5 |

DAVID G. REDINBAUGH, *Primary Examiner.*

J. E. BECK, T. A. GALLAGHER, *Assistant Examiners.*